UNITED STATES PATENT OFFICE.

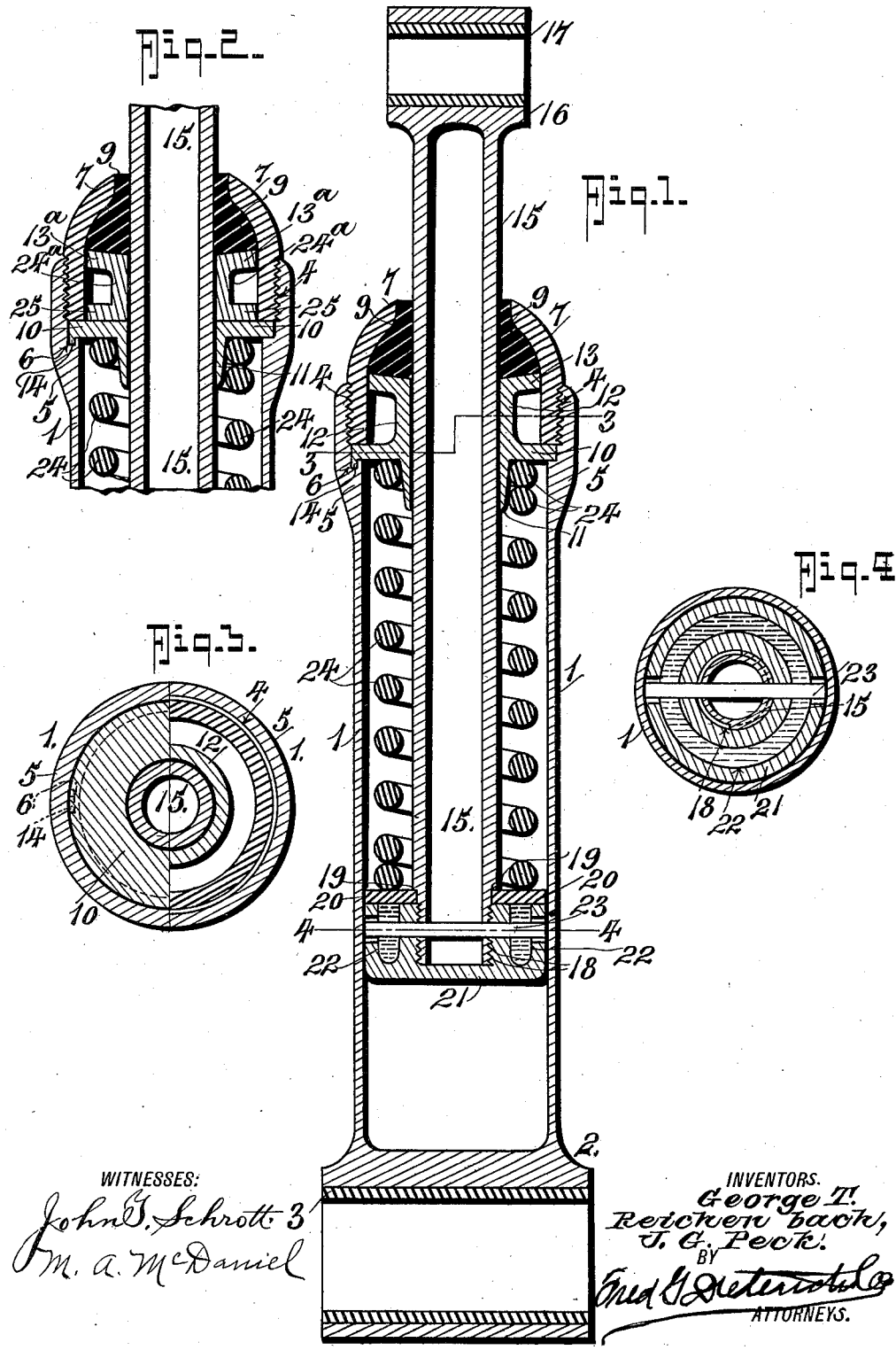

GEORGE T. REICHENBACH AND JACOB G. PECK, OF PORTLAND, OREGON, ASSIGNORS TO H. O. PECK AUTOMOBILE WHEEL COMPANY, INCORPORATED, OF PORTLAND, OREGON.

RESILIENT SPOKE.

1,029,401. Specification of Letters Patent. Patented June 11, 1912.

Application filed May 10, 1911. Serial No. 626,159.

*To all whom it may concern:*

Be it known that we, GEORGE T. REICHENBACH and JACOB G. PECK, both residing at Portland, in the county of Multnomah and State of Oregon, have invented certain new and useful Improvements in Resilient Spokes, of which the following is a specification.

Our invention is an improved resilient spoke for vehicle wheels, and the invention has for its object to provide a spoke that shall be light in weight, strong and non-buckling when in use, simple in its construction, and inexpensive to manufacture.

The invention resides in providing a spoke of the telescopic-section type, in which an outer cylinder is provided, through one end of which a piston rod passes, the rod carrying a specially constructed piston, and the cylinder head being closed by a specially constructed closure device that is light in weight, but strong and efficient in use.

One of the great difficulties encountered in designing a spring spoke wheel is to so produce a structure that will not be of an excessive weight and yet be sufficiently strong to withstand the very great strains imposed upon the wheel in practice.

The invention also includes those novel details of construction, combination and arrangement of parts, all of which will be first fully described, then be specifically pointed out in the appended claims, and illustrated in the accompanying drawings, in which:—

Figure 1, is a vertical longitudinal section of a spoke embodying the invention. Fig. 2, is a detail section showing a slight modification. Figs. 3 and 4, are respective cross sections on the line 3—3 and 4—4 on Fig. 1.

In the drawings, in which like letters and numerals of reference indicate like parts in all of the figures, 1 designates the outer casing which is closed at one end and formed with a hub bearing 2 that may be suitably bushed, as at 3, if desired, and whose other end is internally threaded at 4, and provided with a shoulder 5 to receive the web 10 of a bearing sleeve 11—12. The web 10 has a teat 14 to rest in a recess 6 in the shoulder 5 to prevent the sleeve from turning. Threaded into the end 4 of the cylinder 1 is a hollow nut cap 7 which, when screwed home, jams the web 10 on the shoulder 5. The nut cap 7 has an opening through which the piston rod 15 freely projects. Surrounding the rod 15 within the cap 7 is a packing 9 which rests on the flange 13 of the upper end 12 of the sleeve 11—12, to form an oil-tight closure for the cylinder 1. The rod 15 has a bearing end 16 that may be suitably bushed at 17, if desired.

In order to reduce the weight of the spoke as much as possible without decreasing its strength, the rod 15 is made tubular and the lower end is closed by a cap 21 which is threaded at 18 onto the rod 15. The rod 15 has a shoulder 19 and carries a washer 20 which closes the chamber 22 in the cap 21. A pin 23 holds the cap 21 from turning off.

The usual spring 24 is employed to telescope the spoke sections 1 and 15.

In practice the pocket 22 is filled with lubricant which will flow out through the pin hole 23 and lubricate the piston formed by the cap 21 and washer 20, the pin hole being made larger than the pin for this purpose.

From the foregoing description it will be seen by the construction shown and described a relatively light spoke is obtained without sacrificing strength and the necessary bearing for the section 15 at the head of the spoke which is provided with the minimum weight.

Instead of making the sleeve section 12 integral with the web 10, it may be as a separate element 24ᵃ, as shown in Fig. 2 of the drawings, and when that is the case, it is provided with a flange 25 in addition to the flange 13ᵃ so as to rest on the web 10 and prevent rattling, the flanges 13ᵃ and 25 extending the full diameter of the cap 7 so as to make a relatively rigid contact therewith.

What we claim is:—

1. A resilient spoke for vehicle wheels and the like comprising a cylinder, a piston rod projecting into said cylinder, a piston in said cylinder including a cap threaded onto the end of said piston rod, said cap having a pocket opening at the top, a washer on said piston rod for closing said pocket, a pin hole passing through said cap and piston rod, and a pin of lesser diameter than said pin hole held in said pin hole and a cushioning means within said cylinder coöperating with said piston.

2. In a resilient spoke for vehicle wheels and the like, a cylinder section having an open end, a piston rod projecting through said open end, said cylinder having a seat adjacent to its open end, a web held on said seat, a tubular cap threaded into said open end of said cylinder to engage said web and retain it on its seat, said web and said cap having an aperture to permit passage of said piston rod, and a rod packing carried within said cap and a cushioning means within said cylinder coöperating with said piston.

3. In a resilient spoke for vehicle wheels and the like, a cylinder section having an open end, a piston rod projecting through said open end, said cylinder having a seat adjacent to its open end, a web held on said seat, a tubular cap threaded into said open end of said cylinder to engage said web and retain it on its seat, said web and said cap having an aperture to permit passage of said piston rod, a rod packing carried within said cap, said web having a teat and said cylinder having a recess to receive the same and a cushioning means within said cylinder coöperating with said piston.

4. In a resilient spoke for vehicle wheels and the like, a cylinder section having an open end, a piston rod projecting through said open end, said cylinder having a seat adjacent to its open end, a web held on said seat, a tubular cap threaded into said open end of said cylinder to engage said web and retain it on its seat, said web and said cap having an aperture to permit passage of said piston rod, a rod packing carried within said cap, and a tubular bearing sleeve for said piston rod carried by said web, and a cushioning means within said cylinder coöperating with said piston.

5. In a resilient spoke for vehicle wheels and the like, a cylinder section having an open end, a piston rod projecting through said open end, said cylinder having a seat adjacent to its open end, a web held on said seat, a tubular cap threaded into said open end of said cylinder to engage said web and retain it on its seat, said web and said cap having an aperture to permit passage of said piston rod, a rod packing carried within said cap, a tubular bearing sleeve for said piston rod carried by said web, said bearing sleeve having a flange at its upper end to engage said cap, said rod packing being mounted between the apertured end of said cap and said flange and a cushioning means within said cylinder coöperating with said piston.

6. In a resilient spoke, a piston rod, a piston carried by said piston rod, and a cylinder in which said piston operates, said piston including a cap secured over the end of said piston rod and having a lubricant pocket opening at the top of the cap, a washer carried by said piston rod to close said lubricant pocket, said cap having lubricant conveying holes for conveying said lubricant to the outside of said cap and a cushioning means within said cylinder coöperating with said piston.

7. In a resilient spoke for vehicle wheels and the like, a cylinder section having an open end, a piston rod projecting through said open end, a bearing member mounted in the open end of said cylinder and having a passage through which said piston rod projects, said bearing member including a web, a tubular cap threaded to the open end of said cylinder to secure said web in contact with said cylinder to hold said bearing member immovable, said cap having an aperture to permit passage of said piston rod, and a rod packing within said cap between the rod aperture of the cap and said bearing member together with a cushioning means within said cylinder coöperating with said piston.

G. T. REICHENBACH.
JACOB G. PECK.

Witnesses to Reichenbach's signature:
  A. E. Dieterich,
  Fred G. Dieterich.
Witnesses to Peck's signature:
  C. H. Browne,
  W. Brown.